United States Patent [19]  
Smith, Jr.

[11] 3,744,080  
[45] July 10, 1973

[54] CASTER BRUSH ASSEMBLY

[76] Inventor: James S. Smith, Jr., 2443 Armstrong Circle, Gastonia, N.C. 28052

[22] Filed: Aug. 4, 1971

[21] Appl. No.: 168,947

[52] U.S. Cl. ............... 15/256.51, 16/41, 280/158 R
[51] Int. Cl. ............................................. B60b 33/00
[58] Field of Search ..................... 16/41; 15/256.51, 15/160, 205; 280/158 R, 158 A

[56] References Cited
UNITED STATES PATENTS

| 3,222,708 | 12/1965 | Butsch | 16/41 |
| 1,616,268 | 2/1927 | Pierre | 280/158 R |
| 2,589,620 | 3/1952 | Leffel | 15/256.51 X |
| 2,046,384 | 7/1936 | Katcher | 16/41 X |
| 2,989,766 | 6/1961 | Hoag | 15/205 X |

Primary Examiner—Leon G. Machlin  
Attorney—Wellington M. Manning, Jr.

[57] ABSTRACT

A caster brush assembly is disclosed for use in conjunction with a caster for an industrial truck or the like where lint, string, or other unwanted materials are apt to be picked up by the caster or wheel and become secured or embedded around the caster so as to impede caster operation and create cleanliness problems. The assembly comprises a housing that is securable around a caster and has a plurality of bristle assemblies removably attached thereto, and extending inwardly and contacting the caster. Bristles of certain of said assemblies are, in part, of different lengths so as to provide a tapered bristle surface against the contact area with the caster. A smooth surface is thus provided to shear unwanted materials away from the caster as they are picked up off the floor. It is preferred to provide bristles on all four sides of the caster within the housing so as to completely enclose the caster. A brush assembly per se is also claimed as is an industrial truck being equipped with the caster brush assembly. The housing is conveniently removable from the caster when cleaning is required.

9 Claims, 8 Drawing Figures

PATENTED JUL 10 1973 3,744,080
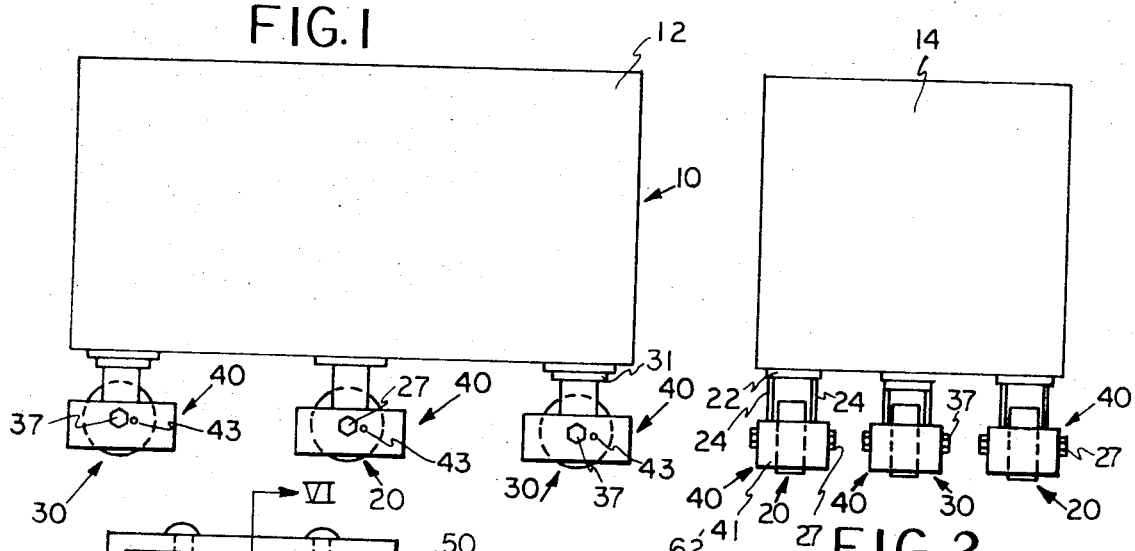
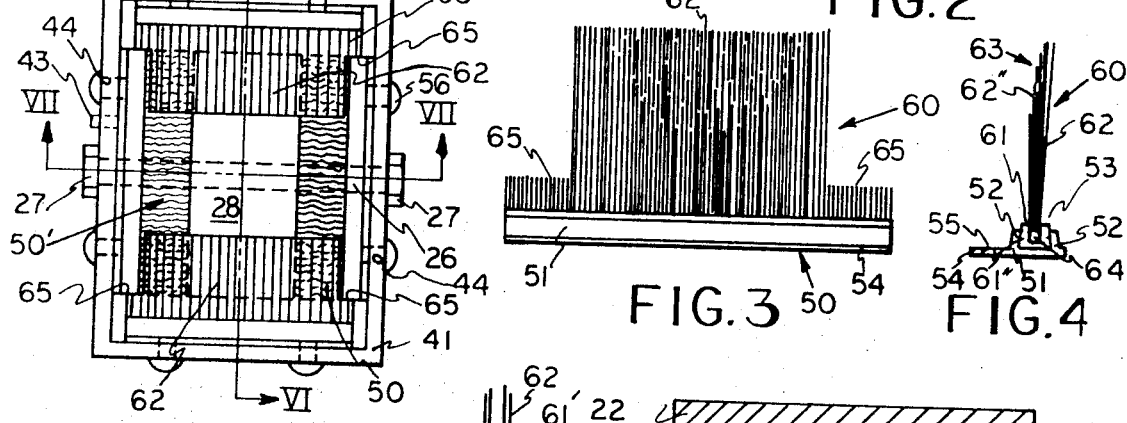
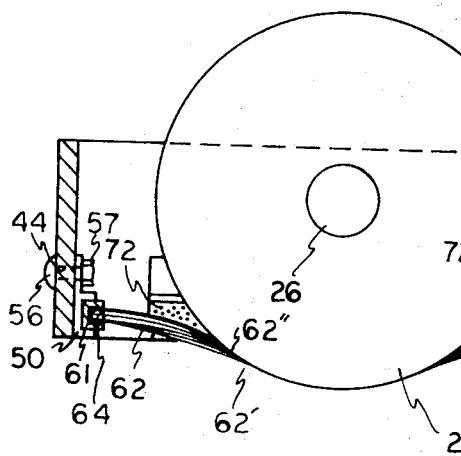
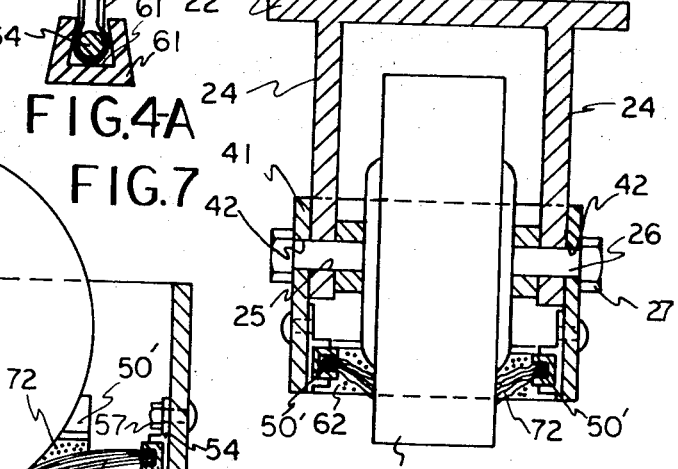
INVENTOR.
JAMES S. SMITH SR.
BY
Wellington M. Manning Jr.
ATTORNEY

CASTER BRUSH ASSEMBLY

BACKGROUND OF THE INVENTION

Industrial hand trucks, especially those used in the textile industry have been plagued with problems for years, in that, unwanted materials such as string, yarn, lint and the like are picked up by the casters as the truck rolls along and thereafter become embedded around the caster axels or in the casters so as to impede caster operation. These trucks after a short period of time must be taken out of service and hand cleaned to remove the materials from around the casters. In fact, a normal textile mill might employ two men full time for the truck cleaning operation which adds to the overhead of the mill. Moreover, a larger number of trucks are required to maintain a desired number in service at all times.

The availability of lint, yarn and the like in the textile mill, for example, compounds the problem and the present cleaning cycles are frequent. This type operation not only creates a safety hazard, in that, the caster operation will not perform as intended, once the materials collect therearound, but also good serviceability of the trucks is required due to the fact that the trucks are often manipulated by women operators.

A great deal of effort has been expended in attempting to provide a suitable means for keeping the truck casters clean. Regardless of the means employed to continually clean the casters, a gradual build up will eventually occur at which time the caster must be cleaned. Prior efforts have failed due to inability to successfully divert the unwanted materials from the caster axels or difficulty in cleaning the casters at the less frequent interval when the build up of material occurs. Prior attempts have included contacting the caster or wheel with rigid metal scraper blades, flexible metal scraper blades, and various brush arrangements, and completely enclosing the caster and caster assembly except for the portion of the caster in contact with the floor. In fact, some prior attempts have been completely negated due to the difficulty encountered in cleaning the casters even though on a less frequent clean cycle. This difficulty of cleaning has stemmed from the apparatus holding the scrapers, brushes and the like where the apparatus is not conveniently removable or manipulatable to provide access to the caster for cleaning.

Though the above listed and numerous additional approaches to cleaning casters have been made, the same or equivalent cleaning problems exist today. The present invention does, however, provide a solution to the problem. By virtue of the cleaning equipment taught herein, industrial truck casters can now remain clean for greatly extended periods of time thus reducing the labor required for truck cleaning and improving the usefulness of the trucks. Further at the time when truck cleaning is required, removal or adjustment of the present apparatus permits cleaning without any appreciable difference from the normal caster that is not equipped with cleaning apparatus.

The prior art contains numerous teachings of means to clean casters, bicycle wheels, tires, wheelchair wheels and the like. There is, however, no teaching or suggestion of the present invention in the known prior art. Exemplary of the prior art are U. S. Pat. Nos. 602,193 to Neuert; 626,018 to Dunlop et al., 719,608 to Peterson; 2,832,085 to Chamberlain; 3,204,285 to Butsch; 3,214,786 to Butsch; 3,222,708 to Butsch and 3,231,293 to Loustaunau.

SUMMARY OF THE INVENTION

It is an object of the present invention to provide a novel cleaning brush assembly for attachment around a caster.

A further object of the present invention is to provide a novel self-cleaning caster for an industrial truck or the like.

Still further, another object of the present invention is to provide a novel brush for cleaning wheels, casters or the like.

Generally speaking, the present invention comprises a self-cleaning caster brush assembly for mounting on a caster that is rotatably supported by a suitable frame, said assembly comprising a housing, said housing being securable around said caster and apart therefrom, a first bristle assembly, said bristle assembly comprising an elongated slotted member, said member being securable within said housing, and a plurality of bristles received within the slot on said slotted member and held therein, certain of said bristles being of different lengths to contact said caster and provide a shear surface along the caster area, and a second bristle assembly, said second assembly being securable within said housing on an opposite side of said caster, certain of said bristles of said second assembly being of different lengths to contact said opposite side of said caster and provide a shear surface along the contact area therebetween.

More specifically, the present invention is directed to an assembly that is mountable around a caster such as might be found movably supporting a textile doff truck or the like.

The assembly of the present invention surrounds the caster and is provided with a plurality of brush assemblies that shear materials away from the caster as the material is picked up from the floor. As such, these unwanted materials are not permitted to reach the area of the caster where damage could be done.

According to the teachings of the present invention, a plurality of bristles are provided to make up a bristle assembly. At least two of such bristle assemblies are secured to opposite ends of the housing. The bristles then extend inwardly and contact opposite ends of the caster. Certain of the bristles are cut to different lengths to provide a tapered or chisel cut bristle surface. The tapered surface thus makes even contact with the caster around a portion of the circumference thereof and provides a surface to shear away or divert the unwanted materials as they are picked up off the floor by the caster. Since both ends of the caster are provided with a bristle assembly, the caster is continuously cleaned regardless of the direction of rotation thereof.

In addition to the end bristles that shear materials from the caster, it is preferred that a bristle assembly also be presented on each side of the caster. The caster would then be completely enclosed with bristles which would preclude the passage of unwanted materials above the lower part of the caster in contact with the floor.

The caster brush assembly of the present invention is quite advantageous to operation of the industrial truck, in that, the unwanted materials are precluded from attachment thereto. Hence normal caster operation continues for a significantly longer period of time than is now being experienced. The chisel cut or taper to the bristles provide a larger contact area between the bristles and the caster. Moreover, with the caster rotating into the longer bristles first, there is a greater resistance to the passage of materials thereby. Further, since the majority of these trucks are multi-directional and subject to be pushed from either end, the bristle assemblies should be placed on opposite ends of the caster to shear away materials regardless of the direction of rotation of the caster.

Through continued use of the caster brush assembly of the present invention, constant contact between the caster and the bristles causes the bristles to wear down. The present apparatus makes provision for such an eventuality and is designed in such a manner that individual bristle assemblies are attached to the housing as modular units that may be easily replaced when needed.

The particular arrangement for producing the bristle modules permits proper useage of the bristle modules without the danger of inadvertent removal of some or all of the bristles. Proper bristle retention has also been recognized as a long standing problem. The bristles as taught herein thus also solve a problem. Present bristles are presented in a U shape in a slot with a rod like member residing in the bottom of the "U" on top of the bristles. The slotted member is then crimped at both ends against the rod like member whereby the bristles are then well secured against inadvertent removal from the caster brush assembly.

BRIEF DESCRIPTION OF THE DRAWINGS

FIG. 1 is a side elevational view of an industrial truck showing the caster brush assemblies mounted around the casters that movably support the truck.

FIG. 2 is an end view of the industrial truck as shown in FIG. 1.

FIG. 3 is a front elevational view of a bristle assembly according to the teachings of the present invention.

FIG. 4 is a side elevational view of the bristle assembly shown in FIG. 3.

FIG. 4-A is a side cross section of a brush according to the teachings of the present invention.

FIG. 5 is a top plan view of a mounted caster brush assembly according to the teachings of the present invention.

FIG. 6 is a side cross sectional view of the caster housing as shown in FIG. 5 and taken along lines VI—VI.

FIG. 7 is an end cross sectional view of the caster brush assembly as shown in FIG. 5 and taken along lines VII—VII.

DESCRIPTION OF THE PREFERRED EMBODIMENTS

Referring to the Figures, preferred embodiments of the present invention will now be described in detail. In FIG. 1, there is shown an industrial truck having a body generally indicated as 10 and rigid and swivel caster assemblies 20 and 30 respectively, to be described hereinafter, secured in suitable fashion to the underside thereof. Body 10 of the industrial truck is made up of side walls 12, end walls 14 and a bottom wall (not shown), said walls being secured at adjacent edges to provide a container for textile bobbins, waste, or other industrial parts. The industrial truck as shown is propelled manually by an operator from either end and guided by applying a turning pressure on the end being pushed. The appropriate swivel caster assembly 30 then turns around a swivel connection 31 in the proper direction and the truck follows in the intended direction. It can readily be seen than an accumulation of textile waste, for example, would greatly hamper the normal operation of such a truck. The caster brush assembly of the present invention shown generally as 40 is secured around caster assemblies 20 and 30 in FIGS. 1 and 2 and held thereon by nuts 27 and 37 respectively, or the like.

Stationary casters 20 as shown in FIGS. 1, 2 and 7 comprise a bracket 22 which is secured to the bottom wall (not shown) of truck body 10 and has a pair of legs 24 secured thereto and extending downwardly therefrom. As can best be seen in FIG. 7, an axel 26 passes through corresponding journals 25 in legs 24 and receives a caster 28 thereon. Caster 28 is appropriately provided with the desired ball or roller bearings or the like (not shown) so as to permit easy rotation thereof. Caster brush assembly 40 is comprised of a housing 41 that extends around caster 28 and is secured to axel 26 by journals 42 and by nuts 27 or the like (See FIG. 7). Set screws 43 or the like may also be provided to prevent movement of housing 41 with respect to axel 26 if desired. Housing 41 preferably extends from just above the bottom of caster 28 to just above axel 26. Having such dimensions, housing 41 can properly present the brush assemblies to caster 28 while leaving room thereabove to permit hand cleaning of the caster assembly at the proper time. Further, if desired, set screws 43 can be removed and housing 41 pivoted around axel 26 to permit greater access to caster 28, axel 26 and the like.

Housing 41 receives two bristle assemblies 50. Bristle assemblies 50 engage opposite ends of caster 28 to shear away the materials lifted from the floor by caster 28. Referring to FIGS. 3, 4 and 6, bristle assembly 50 is comprised of a base 51 having upstanding arms 52 that define a slot 52 therebetween. Arms 52 slant slightly in towards each other to render the width of slot 53 greater at the bottom than the top, thus assisting in holding a brush generally indicated as 60 therein. A flange 54 extends outwardly from base 51 and is provided with a plurality of openings 55 along the length thereof for securing same to housing 41. Bolts 56 may thus pass through openings 55 in flange 54 of brush assembly 50, through corresponding openings 44 in housing 41 and be secured in place by nuts 57 or the like. Brush 60, as will be more specifically described provides a plurality of bristles 62 which, when held by bristle assembly 50 within housing 41 extends inwardly and contacts one end of caster 28.

Brush 60 as shown in FIGS. 3, 4 and 4-A is comprised of a U shaped bristle holder 61 having a plurality of bristles 62 secured therealong. Bristles 62 are preferably U shaped with the U resting within a slot 61' of bristle holder 61. A rod like member 64 is placed within the U of bristles 62 and extends along the length of holder 61. The length of bristles is then firmly secured within holder 61 when the ends 61' of holder 61 are forced inwardly to entrap rod like members 64 therebetween. Bristles 62 may be pre cut to a desired length, or preferably may be cut after being fashioned into brush 60. In order to properly remove materials from caster 28, good contact must be had between bristles 62 and caster 28 while bristles 62 preferably have a certain degree of flexibility. A chisel cut across the bristles 62 that make contact with caster 28 provides a taper 63 to bristles 62 with the longer bristles 62' riding nearest the bottom of caster 28 and the progressively shorter bristles 62" being provided underneath (See FIG. 6). The chisel cut of the bristles 62 thus permits bristles 62 to function as a plurality of shears for removal of materials from caster 28. Conversely, if the bristles did not have the chisel cut or taper, the bottom bristles would force the top bristles away from caster 28 whereby the shearing efficiency would be gravely reduced and materials could pass thereunder. Referring specifically to FIGS. 3 and 5, it will be seen that bristles 62 on opposite ends of brush 60 are cut down appreciably to provide a shoulder 65. Such an arrangement is preferred when bristle assemblies 50' are also provided on the sides of caster 28 to completely encircle caster 28 with brush assemblies.

As shown in FIGS. 5, 6 and 7, side bristle assemblies 50' may also be provided and secured within housing 41. As mentioned above, the inclusion of side bristle assemblies 50' completely encircles caster 28 to prevent any appreciable material from passing from the floor to axel 26 or thereabouts. Side bristle assemblies 50' are of the same design as end bristle assemblies 50 with the exception of the kind and shape of bristles being employed. The bristles 72 for side bristle assembly 50' are in general much shorter than shear bristles 62 provided with end bristle assemblies 50. Side bristles 72 merely engage the sides of caster 28 and scrape same during rotation or reside immediately adjacent, but apart from caster 28. There is no shearing action and bristles 72 need not be chisel cut. It is preferable that side bristles 72 be more rigid than end bristles 62 and may be wavy along their lengths.

Viewing the whole assembly in FIGS. 5, 6 and 7, it can be seen that housing 41 surrounds caster 28 but remains apart therefrom. Bristle assemblies 50 are secured by bolts 56 to the inside of housing 41 and the shear bristles 62 extend inwardly into contact with caster 28. In FIG. 5, only a limited number of bristles 62 are shown to retain clarity in the drawing. Obviously, a large number of bristles such as shown in FIG. 3 would preferably be employed. Side bristle assemblies are secured within opposite sides of housing 41 by bolts 56 and bristles 72 extend inwardly into contact with opposite sides of caster 28. Shoulder 65 of bristle assemblies 50 engage the ends of side bristle assemblies 50' to completely encircle caster 28. Regardless of the directions of rotation of caster 28, if the arrangement described above is employed, materials will be sheared from caster 28 and redeposited on the floor or held by the brush assembly.

Removal of bristle assemblies 50 from the ends of housing 41 or side assemblies 50' from the sides of housing 41 is accomplished by removing the bolts 56 holding same. Once removed from housing 41, a new end brush 60 or side brush 60' may be readily installed and the bristle assembly 50 or 50' resecured in place. After housing 41 is installed around caster 28, there will be no need to remove same unless cleaning dictates. Hence reconditioning of the caster brush assembly of the present invention is also quite simple.

The same type brush assembly may be employed for either rigid or swivel caster. Insofar as materials of construction are concerned, metal or plastic are preferred for the structural parts of the apparatus while bristles may be a synthetic material such as nylon or any other suitable material. Furthermore, depending upon the particular environment in which the truck might be used, the bristles employed on either the ends or the sides may be selected towards removing a particular type material. For example, the type bristles needed for removing yarn from a caster may differ from the bristles needed to remove steel shavings, etc.

Having described the present invention in detail, it is obvious that one skilled in the art will be able to make variations and modifications thereto without departing from the scope of the invention. The scope of the present invention should be determined only by the claims appended hereto.

What is claimed is:

1. A brush assembly for continuously cleaning a caster comprising:
   a. a housing, said housing being securable around and surrounding a caster and apart therefrom;
   b. a first bristle assembly removably secured within one end of said housing, said bristle assembly having a plurality of bristles extending inwardly of said housing and substantially filling the space between said end of said housing and said caster, certain of said bristles being of different lengths to provide a shear surface contactable with said caster along one end thereof; and
   c. a second bristle assembly removably secured within an opposite end of said housing, said second bristle assembly having a plurality of bristles extending inwardly of said housing and substantially filling the space between said end of said housing and said caster, certain of said bristles being of different lengths to provide a shear surface contactable with said caster along an opposite end thereof.

2. A brush assembly for continuously cleaning a caster as defined in claim 1 comprising further third and fourth bristle assemblies removably secured within said housing at opposite sides thereof, said third and fourth assemblies having bristles extending inwardly of said housing towards opposite sides of said caster.

3. A brush assembly for continuously cleaning a caster as defined in claim 1 wherein said bristle assemblies comprise a slotted member securable within said housing and a brush removably receivable within said slot of said slotted member.

4. A brush assembly for continuously cleaning a caster as defined in claim 3 wherein said brush comprises a slotted bristle holder and a plurality of bristles secured therealong.

5. A brush assembly for continuously cleaning a caster as defined in claim 4 wherein said bristles have a member resting thereon, said member being secured within said bristle holder to further secure bristles therein.

6. A brush assembly for continuously cleaning a caster as defined in claim 2 wherein said bristles in said third and fourth bristle assemblies are wavy along their lengths.

7. A brush assembly for continuously cleaning a caster secured to and supporting a container comprising:
   a. a housing, said housing being securable around said caster and apart therefrom;
   b. first and second bristle assemblies removably secured within opposite ends of said housing, each bristle assembly comprising a flanged base, said base having two legs extending outwardly therefrom and defining a slot therebetween, and a brush removably receivable in said slot, said brush having bristles therealong, said bristles extending inwardly of said housing and having a tapered end thereof, said tapered bristle end being contactable with said caster along one end thereof; and c. third and fourth bristle assemblies removably secured within opposite sides of said housing, each said bristle assembly comprising a flanged base, said base having two legs extending outwardly therefrom and defining a slot therebetween, and a brush removably receivable in said slot, said brush having bristles therealong, said bristles extending inwardly of said housing to a point at least immediately adjacent opposite sides of said caster.

8. A brush assembly for continuously cleaning a caster comprising:

a. a housing, said housing being securable around a caster and apart therefrom;

b. a first bristle assembly removably secured within one end of said housing, said bristle assembly having a plurality of bristles extending inwardly of said housing, certain of said bristles being of different lengths to provide a shear surface contactable with said caster along an end thereof;

c. a second bristle assembly removably secured within an opposite end of said housing, said second bristle assembly having a plurality of bristles extending inwardly of said housing, certain of said bristles being of different lengths to provide a shear surface contactable with said caster along an opposite end thereof; and d. third and fourth bristle assemblies removably secured within said housing at opposite sides thereof, said third and fourth assemblies having bristles extending inwardly of said housing towards opposite sides of said caster.

9. A brush assembly for continuously cleaning a caster as defined in claim 8 wherein said bristles and said third and fourth bristle assemblies are wavy along their lengths.

* * * * *